UNITED STATES PATENT OFFICE.

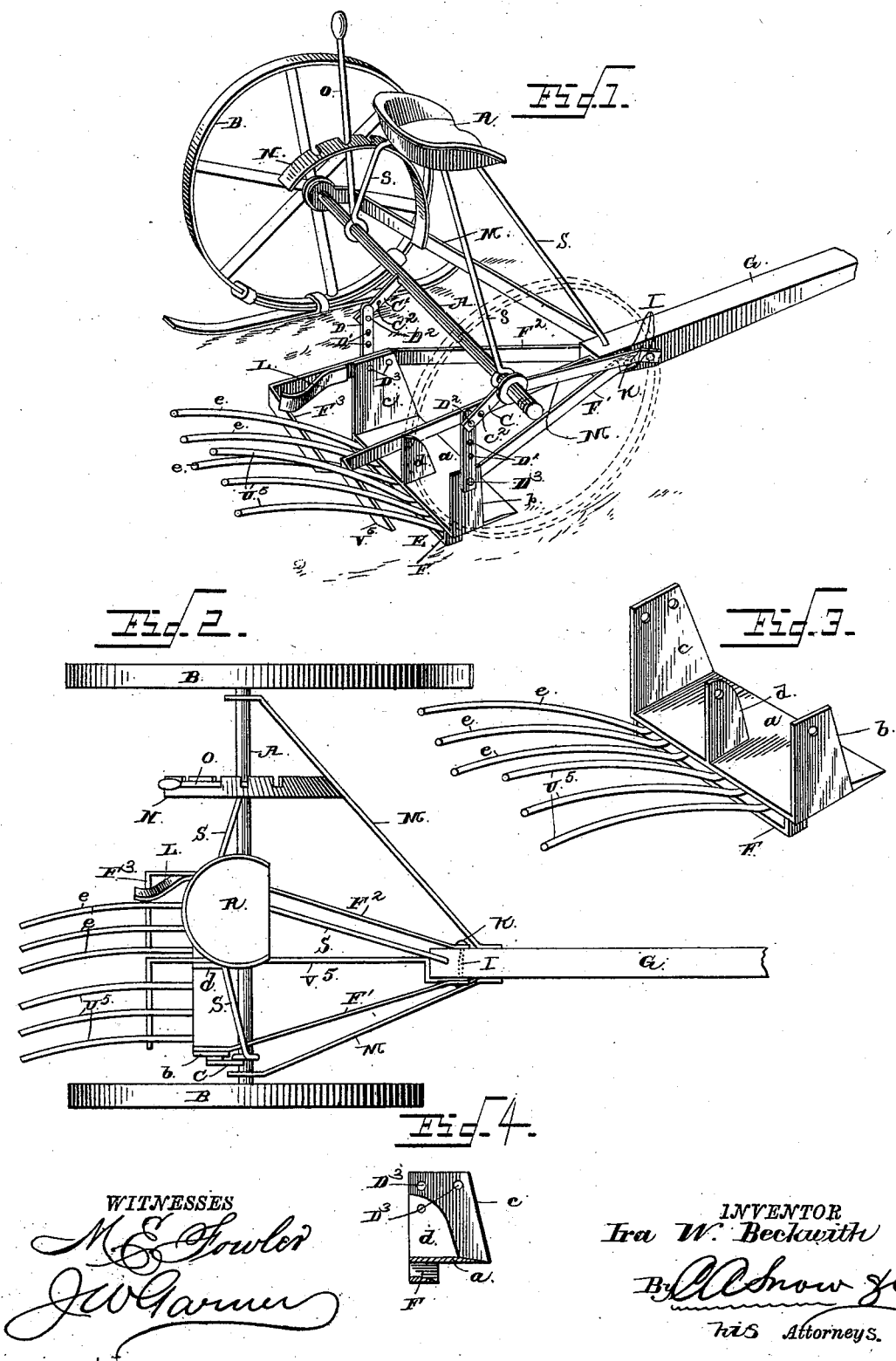

IRA W. BECKWITH, OF HUMBOLDT, NEBRASKA, ASSIGNOR OF ONE-HALF TO OLNEY M. WHITCOMB, OF SAME PLACE.

SULKY-PLOW.

SPECIFICATION forming part of Letters Patent No. 361,257, dated April 19, 1887.

Application filed July 21, 1885. Renewed March 1, 1887. Serial No. 229,377. (No model.)

*To all whom it may concern:*

Be it known that I, IRA W. BECKWITH, a citizen of the United States, residing at Humboldt, in the county of Richardson and State of Nebraska, have invented a new and useful Improvement in Sulky-Plows, of which the following is a specification, reference being had to the accompanying drawings.

My invention relates to an improvement in sulky-plows; and it consists in the peculiar construction and combination of devices that will be more fully set forth hereinafter, and particularly pointed out in the claims.

In the accompanying drawings, Figure 1 is a perspective view of a sulky-plow embodying my invention. Fig. 2 is a top plan view of the same. Figs. 3 and 4 are detailed views.

A represents the axle, on the ends of which are mounted the supporting-wheels B. Near one end of the axle is an arm, C, and near the center of the axle is an arm, C', in line with arm C. These arms are provided with a series of openings, $C^2$, in their outer ends. Links D, which are provided with a series of openings, D', at their upper ends, are secured to the arms by pivotal bolts $D^2$, and to the lower ends of these links is suspended a plow, E, by bolts $D^3$. This plow is composed of the horizontal bottom plate or share, a, sharpened at its front edge, and vertical plates b c at its ends. To the under side of the rear edge of the share are bolted a series of curved turning-rods, e, which are made removable at will. A second set of turning-rods, $U^5$, is supported by a central beam, $V^5$, said beam $V^5$ supported by a central cutting-plate, d, which is adapted to be secured to the center of the share and is removable at will.

F represents a subsoiling horizontal share, that is secured below the share a. The beams F' $F^2$ of the plow are secured to the upper ends of the vertical plates or cutting-wings thereof by the bolts that secure the lower end of the links thereto. These beams are made to approach each other, and between their outer ends is secured a tongue, G. The ends of the beams are provided with openings, through which and through one of a series of openings, I, in the tongue passes a bolt, K, which bolt K may be changed to different holes, thereby regulating the inclination of the edge of the share a. The rear end of the beam $F^2$ extends rearwardly beyond the plow, and is then bent at right angles, as at $F^3$, and extends under and across the turning-rods, so as to support said rods and enable them to withstand the strain.

L represents a curved turning-wing that is bolted to the beam $F^2$ behind the plow, and has its free end bearing on the bent portion $F^3$.

To the front ends of the beams of the plow are bolted brace or frame rods M; the rear ends of which are secured on the ends of the axle, the latter being free to turn therein.

It will be seen by reference to Fig. 2 of the drawings that the tongue is to one side of the center of the frame of the sulky, but directly in line with the center of the plow, thus giving the latter a central draft, relieving it of any side strain and obviating the necessity for a landside.

A notched segment, N, is secured to one of the brace-rods M, and extends over the axle, and to the axle is secured a spring-lever, O, that engages with the notched segment, and by means of which the axle may be turned in the bearings, and thereby raise or lower the plow.

A driver's seat, R, is supported by rods S, which extend to the axle and to the rear end of the beam. The turning-rods e are adapted to be replaced by wide plates.

My plow is especially adapted for use in plowing sod land. As the plow moves forward the sod is bent by the turning-wing L, and turned completely over by the turning-rods. When the central cutting-wing, d, is employed in connection with the second set of turning-rods, the plow turns two furrows at once.

The plow may also be used as a stirring-plow by using extra-wide turning rods or plates. The plow may also be used as a potato-digger, and by taking off all the turning-rods may be used in digging small trees and plants.

By suspending the plow from the axle, as hereinbefore described, the weight of the plow is borne by the wheels, and also its downward suction, thus greatly lessening the draft by preventing the plow from bearing heavily on the bottom of the furrow.

T represents a shoe or runner, adapted to be attached to one of the supporting-wheels and to drag along the ground, for the purpose of steadying the motion of the plow when plowing rough ground.

Having thus described my invention, I claim—

1. The combination, with the plow consisting of the horizontal share $a$ and the vertical end cutting-wings, $b\ c$, of the horizontal subsoiling-share secured below share $a$, substantially as described.

2. The combination, with the plow having the horizontal share and the vertical end cutters, of the beams F F', secured to said cutters, beam F' having rearward-bent extension $F^2$, the turning-rods bolted to the share and supported on extension $F^2$, and the turning-wing, substantially as described.

3. The combination, with the plow having the horizontal share and the vertical end cutting-wings, of the vertical cutting-wing $d$, adapted to be secured to the center of the share or to be removed therefrom, substantially as described.

4. In a sulky-plow, the combination of the plow having the horizontal share $a$ and the vertical end cutting-wings, $b\ c$, the tongue, and the beams $F'\ F^2$, connected thereto and to the vertical cutting-wings to secure the plow to the tongue, so that the center of the former will be in a line with the center of the latter, substantially as described.

5. The plow having the horizontal share $a$, the vertical end cutting-wings, $b\ c$, and the detachable vertical central cutting-plate, $d$, the beam $F^2$, secured to wing $c$ and having the supporting-arm $F^3$, the beam $V^5$, secured to the cutting-plate $d$, and the turning-rods secured to the share and supported on the arm $F^3$ and the beam $V^5$, substantially as described.

6. The plow having the horizontal share, the vertical end cutting-wings, the beam having the bent supporting-arm, the turning-rods, and the curved turning-wing L, substantially as described.

In testimony that I claim the foregoing as my own I have hereto affixed my signature in presence of two witnesses.

IRA W. BECKWITH.

Witnesses:
B. F. BERRY,
THEODORE JONES.